No. 678,942. Patented July 23, 1901.
F. W. COX.
REFLECTOR.
(Application filed Mar. 5, 1901.)
(No Model.)

Witnesses.
L. C. Reynolds.
John W. McDonald.

Inventor:
F. W. Cox,
by Egerton R. Case
Atty.

UNITED STATES PATENT OFFICE.

FREDERICK WILLIAM COX, OF TORONTO, CANADA.

REFLECTOR.

SPECIFICATION forming part of Letters Patent No. 678,942, dated July 23, 1901.

Application filed March 5, 1901. Serial No. 49,986. (No model.)

*To all whom it may concern:*

Be it known that I, FREDERICK WILLIAM COX, a subject of the King of Great Britain, residing at Toronto, in the county of York, Province of Ontario, Canada, have invented certain new and useful Improvements in Reflectors, of which the following is a specification.

My invention relates to improvements in reflectors; and the object of my invention is to design a reflector which will occupy a small space, and yet have a large reflecting-surface; and it consists, essentially, of a base, shaped as hereinafter described, provided with a plurality of wings, as hereinafter more particularly explained.

Figure 1:
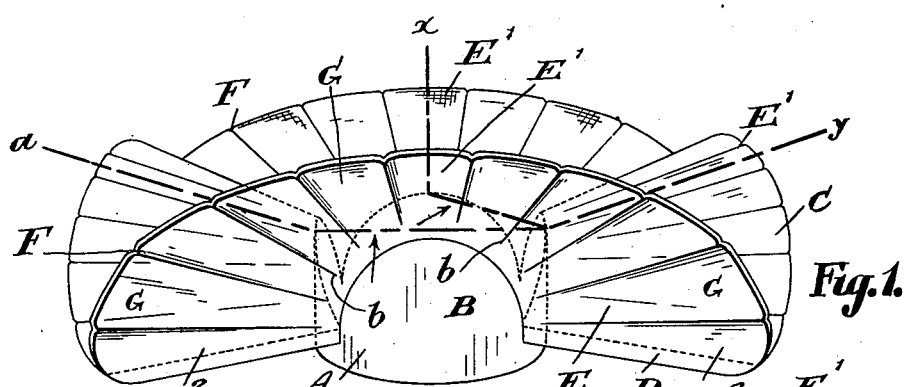
Figure 2:
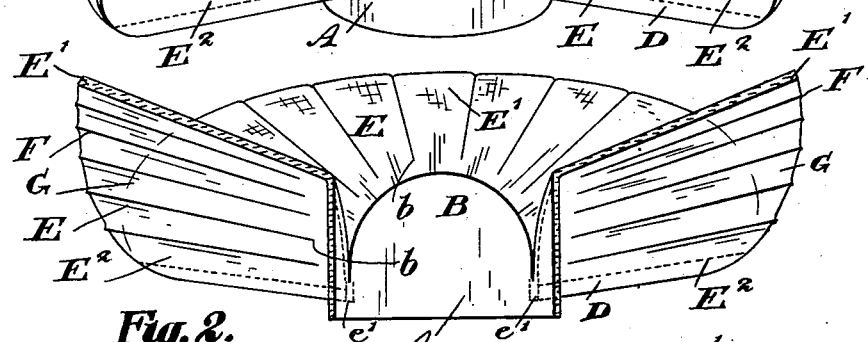
Figures 3, 4:
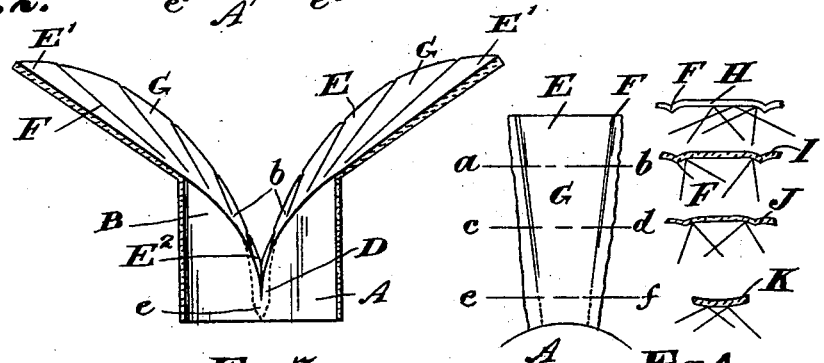

Figure 1 is a general perspective view of my reflector, parts being dotted in. Fig. 2 is a section on the line $a\,y$, Fig. 1, looking in the direction indicated by arrow. Fig. 3 is a section on the line $x\,y$, Fig. 1, looking in the direction indicated by arrow. Fig. 4 is a view of a section of one of the wings, showing sections which show approximately the curvature in the sections.

In the drawings like letters of reference indicate corresponding parts in each figure.

A is the base of the reflector, which is designed to be held by any suitable holder above the light. The base A is composed of a plurality of semicircularly-shaped portions B, as shown, from which extend outwardly at any desired angle the wings C. Each wing C is preferably connected to its adjacent wing for any suitable distance, as shown at D. As will be seen, each wing C is composed of a number of sections E, between which is an outwardly-projecting rib F, which merges into the surface of the wing a short distance from the semicircularly-shaped portions B, as shown at $b$. The inner surface of the wings C may be, if desired, constructed so as to follow the configuration of the outside surface of the said wings; but this is immaterial to my invention. As will be seen, the sections E are widest at their top end and gradually get narrower toward the base A. The central sections E' are the shortest of the said sections, which sections gradually get longer the farther they are removed from said central section and on both sides of same. The space G between the ribs F is about flat near the outer end of the sections E, as shown at H, Fig. 4.

I is a section on the line $a\,b$, J is a section on the line $c\,d$, and K is a section on the line $e\,f$. These sections show approximately the curvature in the sections E. This curvature, it will be readily understood, must necessarily change in the different sections.

The object of the curved ribs F is to deflect the light in different directions, as will be seen on reference to Fig. 4, to what the light is reflected by the space G.

The upper surface of the wings C is coated with a suitable material, such as quicksilver, in order to make the lower surface of said wings reflect the light. The base A is left transparent.

In the drawings I have shown four wings C, forming part of the base A; but it will of course be understood that I may use any suitable number of wings. Nor do I confine myself to the configuration of the surface of the wings C, which may be altered in many ways to provide a good reflecting-surface.

Although I show and describe the wings C as being joined together at their lowest sections, it will be understood that the same may be placed closely together, but yet not join each other. In Fig. 2 I show the edge $e'$ (where the adjacent sections $E^2$ of the wings C join) as being square; but it will of course be understood that the same may be pointed, as shown in dotted lines in Fig. 3 at $e$.

This reflector is more particularly designed to be held above, for instance, and used in connection with the ordinary incandescent mantle, whether the said mantle is used in connection with the ordinary house gas-fixture or in connection with the ordinary street-lamp gas-fixture. The said reflector is placed over the chimney of said mantle, and its lower edge rests upon the usual framework, which supports said chimney, so that the light from said mantle will strike against the lower surface of said reflector, and thus be reflected in the required direction. The said reflector is also designed to be used in connection with the ordinary incandescent mantle attached to the ordinary house or shop fixture for illuminating store-windows.

What I claim as my invention, and desire to secure by Letters Patent, is—

1. A reflector comprising a circular transparent base composed, only at its upper end, of a plurality of semicircularly-shaped portions adjoining each other at their base; a like number of upwardly-curved fan-shaped wings formed integral with said semicircularly-shaped portions and each extended at an upwardly and outwardly inclined angle to said base, the sides of each wing adjoining the sides of its adjacent wings, the upper surface of said wings being coated with suitable material which will make a reflecting-surface of the lower surface of said wings, as described.

2. A reflector comprising a circular transparent base composed, only at its upper end, of a plurality of semicircularly-shaped portions adjoining each other at their base, a like number of upwardly-curved fan-shaped wings formed integral with said semicircularly-shaped portions and each extended at an upwardly and outwardly inclined angle to said base, the sides of each wing adjoining the sides of its adjacent wings, and a number of outwardly-projecting ribs forming an integral part of each of said wings and being on the lower surface of same, the upper surface of said wings being coated with suitable material which will make a reflecting-surface of the lower surface of said wings, as described.

In testimony whereof I have signed my name to this specification in the presence of two subscribing witnesses.

FREDERICK WILLIAM COX.

Witnesses:
EGERTON R. CASE,
LAWRENCE C. REYNOLDS.